(12) United States Patent
Cox et al.

(10) Patent No.: US 8,755,750 B2
(45) Date of Patent: Jun. 17, 2014

(54) WIDE-BANDWIDTH SIGNAL CANCELLER

(75) Inventors: Charles H. Cox, Carlisle, MA (US);
Kevin M. Cuomo, Carlisle, MA (US)

(73) Assignee: Photonic Systems, Inc., Billerica, MA (US)

( * ) Notice: Subject to any disclaimer, the term of this patent is extended or adjusted under 35 U.S.C. 154(b) by 423 days.

(21) Appl. No.: 12/785,437

(22) Filed: May 22, 2010

(65) Prior Publication Data

US 2011/0287720 A1    Nov. 24, 2011

(51) Int. Cl.
*H04B 1/00* (2006.01)
*H04B 15/00* (2006.01)

(52) U.S. Cl.
USPC ........ 455/63.1; 455/3.01; 455/3.05; 370/278; 398/116; 398/117

(58) Field of Classification Search
USPC .............. 455/3.01, 3.05, 63.1, 296, 303, 304, 455/424; 370/278; 398/116, 117, 118, 139, 398/201
See application file for complete search history.

(56) References Cited

U.S. PATENT DOCUMENTS

| | | | |
|---|---|---|---|
| 2,973,512 A | 2/1961 | Walsh | |
| 4,719,412 A | 1/1988 | d'Humieres et al. | |
| 5,073,983 A * | 12/1991 | Pfizenmayer | 398/194 |
| 5,074,631 A | 12/1991 | Hamano et al. | |
| 5,287,212 A | 2/1994 | Cox et al. | |
| 5,303,079 A | 4/1994 | Gnauck et al. | |
| 5,369,381 A | 11/1994 | Gamand | |
| 5,389,782 A | 2/1995 | Hilliard | |
| 5,602,387 A | 2/1997 | Bowen | |
| 5,751,867 A * | 5/1998 | Schaffner et al. | 385/3 |
| 5,977,911 A | 11/1999 | Green et al. | |
| 6,028,695 A | 2/2000 | Uemura et al. | |
| 6,081,232 A | 6/2000 | Pittman et al. | |

(Continued)

FOREIGN PATENT DOCUMENTS

| | | |
|---|---|---|
| EP | 0282293 A2 | 9/1988 |
| FR | 2796766 A1 | 1/2001 |

(Continued)

OTHER PUBLICATIONS

"Notification of Transmittal of the International Search Report and The Written Opinion of The International Searching Authority, or The Declaration" for PCT/US2011/37136, Oct. 25, 2011, 11 pages, International Searching Authority, Korean Intellectual Property Office, Seo-gu, Daejeon, Republic of Korea.

(Continued)

*Primary Examiner* — Tuan H Nguyen
(74) *Attorney, Agent, or Firm* — Kurt Rauschenbach; Rauschenbach Patent Law Group, LLC (57) ABSTRACT

A signal canceller includes a dual-drive electro-optic modulator having separate first and second electrical inputs. The first electrical input is coupled to a first portion of a first signal and the second electrical input is coupled to a second signal and to a second portion of the first signal. A laser generates an optical beam that propagates from the optical input to an optical output of the electro-optic modulator. The dual-drive electro-optic modulator modulates the optical beam with the first and second portions of the first signal and with the second signal. The modulation cancels at least some the first signal and generates a modulation signal with reduced first signal modulation component.

28 Claims, 5 Drawing Sheets

(56) References Cited

U.S. PATENT DOCUMENTS

| | | | |
|---|---|---|---|
| 6,137,442 | A | 10/2000 | Roman et al. |
| 6,175,672 | B1 | 1/2001 | Newberg et al. |
| 6,295,395 | B1 | 9/2001 | Paek |
| 6,310,706 | B1 | 10/2001 | Heidemann et al. |
| 6,320,539 | B1 | 11/2001 | Matthews et al. |
| 6,330,098 | B1 | 12/2001 | Gopalakrishnan |
| 6,337,660 | B1 | 1/2002 | Esman et al. |
| 6,393,177 | B2 | 5/2002 | Paek |
| 7,856,184 | B2 * | 12/2010 | Li ................................. 398/115 |
| 2002/0012500 | A1 | 1/2002 | Paek |
| 2002/0106141 | A1 | 8/2002 | Gopalakrishnan |
| 2003/0090769 | A1 | 5/2003 | Lagasse |
| 2003/0147581 | A1 | 8/2003 | Doi et al. |
| 2005/0069327 | A1 | 3/2005 | Franck et al. |
| 2007/0189778 | A1 | 8/2007 | Burns et al. |
| 2007/0206961 | A1 | 9/2007 | Iannelli |
| 2008/0175593 | A1 | 7/2008 | Li |
| 2010/0029350 | A1 | 2/2010 | Zhang |

FOREIGN PATENT DOCUMENTS

| | | |
|---|---|---|
| JP | 57197934 | 12/1982 |
| JP | 09008737 | 1/1997 |
| WO | 2005008832 A2 | 1/2005 |

OTHER PUBLICATIONS

"Notification Concerning Transmittal of International Preliminary Report on Patentability (Chapter I of the Patent Cooperation Treaty)" for PCT/US2009/041058, Nov. 4, 2010, 6 pages, The International Bureau of WIPO, Geneva, Switzerland.

Notification Concerning Transmittal of International Preliminary Report on Patentability (Chapter I of the Patent Cooperation Treaty), for PCT/US2011/037136, Dec. 6, 2012, 7 pages, International Bureau of WIPO, Geneva, Switzerland.

Duarte, Experiment-Driven Characterization of Full Duplex Wireless Systems, Aug. 4, 2011, 68 pages, Rice University.

"Notification of Transmittal of The International Search Report and The Written Opinion of The International Searching Authority, or The Declaration" For PCT/US08/003297, Jul. 4, 2008, 11 pages, The International Searching Authority/EPO, Rijswijk, The Netherlands.

"Office Action" for U.S. Appl. No. 10/710,463, Apr. 9, 2008, 7 pages, The USPTO, US.

"Office Action" for U.S. Appl. No. 11/353,701, Jul. 25, 2008, 6 pages, The USPTO, US.

"Notification Concerning Transmittal of International Preliminary Report on Patentability (Chapter I of the Patent Cooperation Treaty" for PCT/US2008/003297, Oct. 1, 2009, 8 pages, The International Bureau of WIPO, Geneva, Switzerland.

"Notification of Transmittal of the International Search Report and The Written Opinion of The International Searching Authority, or The Declaration" for PCT/US2009/041058, Nov. 30, 2009, 11 pages, International Searching Authority/Korean Intellectual Property Office, Daejeon, Republic of Korea.

Anderson, Is a Broadband Low Noise Photonic Link an Oymoron?, Proc. 10th Photonic Systems for Antenna Applications Conf., Jan. 2000, Naval Postgraduate School, Monterrey, CA, US.

Ghose, Rabindra N., Interface Mitigation: Theory and Application, IEEE Electromagnetic Compatibility Society Sponsor, 1996, pp. 39-45, 78-86 and 106-114, IEEE Press—The Institute of Electrical and Electronics Engineering, Inc. New York, US.

Choi, et al., Achieving Single Channel, Full Duplex Wireless Communication, MobiCom'10, Sep. 20-24, 2010, 12 pages, Chicago, Illinois, US.

Wegener, et al., Simultaneous Transmit and Receive With a Small Planar Array, Microwave Symposium Digest (MTT), IEEE, 2012, 3 pages, Montreal, Canada.

Ackerman, et al., The Effect of a Mach-Zehnder Modulator's Travelling Wave Electrode Loss on a Photonic Link's Noise Figure, Microwave Photonics 2003, MWP 2003 Proceedings, Sep. 12, 2003, pp. 321-324, Photonic Systems, Inc. Burlington, MA, US.

Wenzel, Charles, Low Frequency Circulator/Isolator Uses No Ferrite or Magnet, RF Design Awards. C. Wenzel, RF Design, Jul. 1991.

* cited by examiner

WIDE-BANDWIDTH SIGNAL CANCELLER

The section headings used herein are for organizational purposes only and should not to be construed as limiting the subject matter described in the present application in any way.

INTRODUCTION

In many environments there are undesired electrical signals present along with desired electrical signals. Often these undesired electrical signals have significant power levels that can interfere with the reception of the desired electrical signals. Sometimes these electrical signals cannot be filtered when the desired electrical signals are detected because they have the same or nearly the same frequency as the desired electrical signals.

An example of systems where it is particularly difficult to cancel the undesired electrical signals is wireless RF systems that are co-located in a single platform, such as a ship or airplane. The undesired signals often interfere with the ability to detect and/or process the desired signals. In some systems, the magnitude of the undesired signals is much greater than the magnitude of the desired electrical signals. In these systems, it is typically necessary to increase the dynamic range of components that must process both the desired and the undesired electrical signals beyond what would be required if only the desired electrical signal was present. Increasing the dynamic range of components increases the cost and sometimes the size of these systems.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Figure 1:
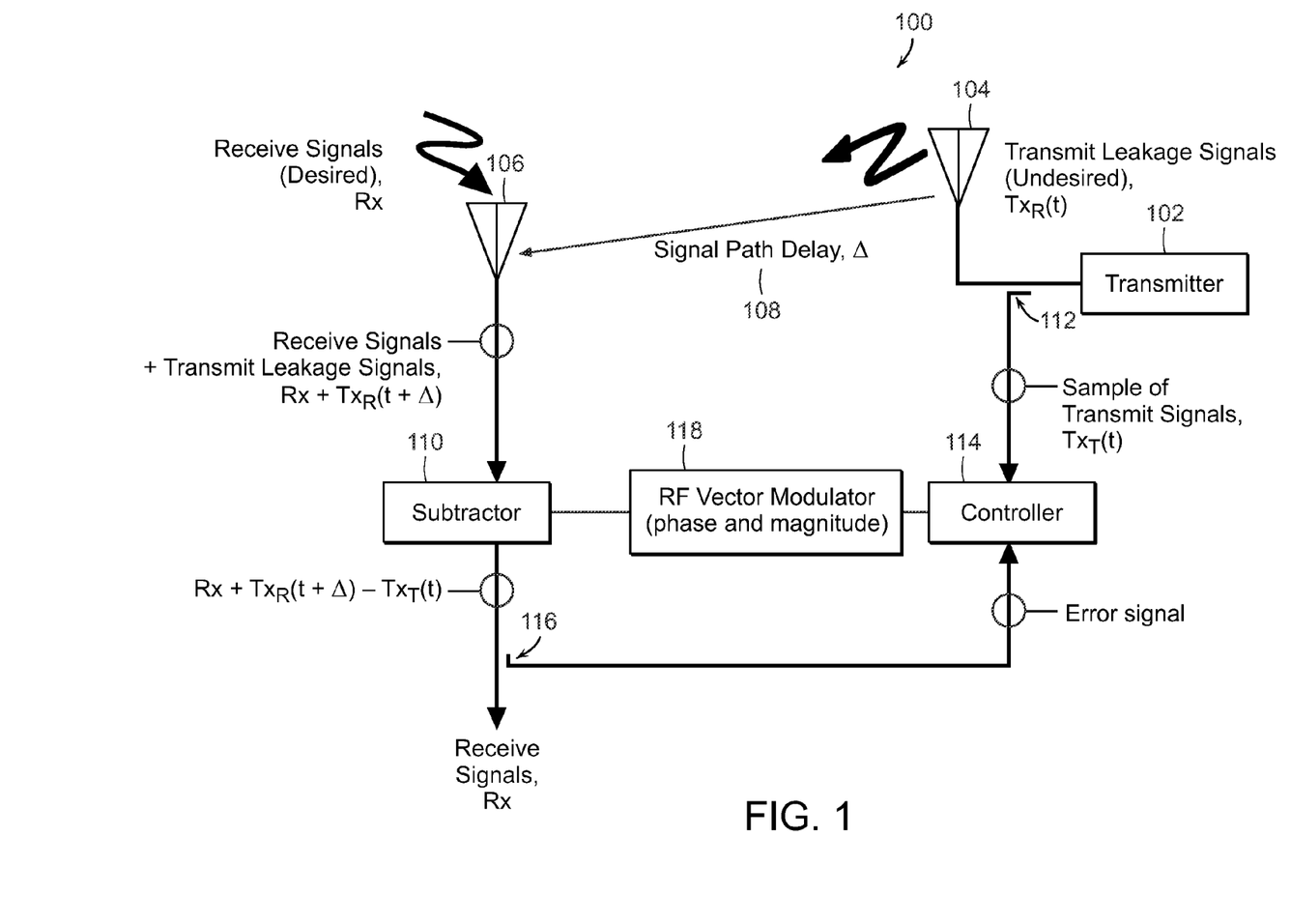
FIG. 1 is a block diagram of a known system for cancelling or suppressing undesired electrical signals.

FIG. 1 is a block diagram of a known signal canceling system 100 for cancelling or suppressing undesired electrical signals. The apparatus shown in FIG. 1 is typical of a system platform, such as an aircraft or ship, where one or more transmitting antennas are positioned in relatively close proximity to reception or transceiver antennas that receive electrical signals with relatively low power levels. In the system shown in FIG. 1, a transmitter 102 is coupled to a transmission antenna 104 that radiates an electrical transmission signal with a relatively high power level compared with typical reception signals. A reception antenna 106 is positioned to receive the desired reception signal. However, in practice the reception antenna 106 receives both the desired reception signal and a portion of the undesirable electrical transmission signal that is delayed by a signal path delay delta 108 as shown in FIG. 1.

The canceling system 100 includes a subtractor 110. A subtractor is defined herein as any component or system that cancels the undesirable transmission signal from a reception signal that includes a combination of the desired reception signal and an undesirable transmission signal. The subtractor 110 shown in FIG. 1 includes a coupler 112 that is positioned to couple a sample or small portion of the undesirable transmission signal. The output of the coupler 112 is electrically connected to a signal input of a controller 114. A second coupler 116 is used to couple a sample or small portion of the output signal generated by the subtractor 110. The output of the second coupler 116 is electrically connected to an error signal input of the controller 114.

The controller 114 processes the sample of the undesirable transmission signal from the subtractor 110 and then adjusts the magnitude and the phase of the sample of the undesired transmission signal to substantially equal the magnitude and phase of the actual undesired transmission signal received at the reception antenna 106. Ideally, the controller 114 generates a signal that when subtracted from the desired receive signal Rx in the subtractor 110 results in the elimination of the undesired signal. However, there are typically several factors that contribute to less than perfect signal cancellation of the undesired transmission signal in the subtractor 110.

One of the factors that contribute to less than perfect signal cancellation of the undesired transmission signal is the signal path delay delta 108 between the transmission antenna 104 and the reception antenna 106. Compensating for the signal path delay delta 108 is difficult because the signal path delay 108 depends upon the particular location of the equipment, which may not always be a fixed location. The reception equipment must then be modified to compensate for the particular signal path delay 108. Furthermore, many practical systems have multiple signal path delays. In such systems, it is not usually possible to totally compensate for all the signal path delays.

For many systems of practical interest that have undesirable signals at significant powers levels, it is possible to avoid the limitations caused by the true time delay between the transmission antenna 104 and the reception antenna 106 by converting the true time delay to a phase change. It is known in the RF art that one can substitute a phase change for the true time delay if the signal bandwidth is small enough. In the system shown in FIG. 1, a vector modulator 118 is used to adjust the phase and magnitude of the undesired transmission signal to compensate for the true time delay. However, as the bandwidth of the undesired transmission signals increases, the degree of cancellation will degrade with phase shift and it will become necessary to compensate for the true time delay. Current state-of-the art ultra-broadband transmissions will require at least some compensation for the true time delay.

In addition, as the bandwidth of the undesired transmission signal increases, the bandwidth of the subtractor 110 becomes a significant limitation and consequently the subtractor 110 is not able to fully cancel the undesirable transmission signal. The subtractor 110 is often implemented as a directional coupler. Such directional couplers have bandwidths that are limited to about a decade of bandwidth. In many state-of-the art systems, signal cancellation needs to be performed over two, three, or even more decades of bandwidth.

One aspect of the present teaching relates to using an electro-optical modulator and various signal processing algorithms executing on signal processor hardware to cancel or suppress undesired electrical signals over a wide signal bandwidth. One feature of the methods and apparatus of the present teaching is that cancelation can be accomplished even when the undesirable signals overlap with the desired signal in time and/or frequency and without the need for a physical time delay. In one aspect of the present teaching, a dual-drive electro-optic modulator is used to achieve wide-bandwidth signal cancelation.

Figure 2:
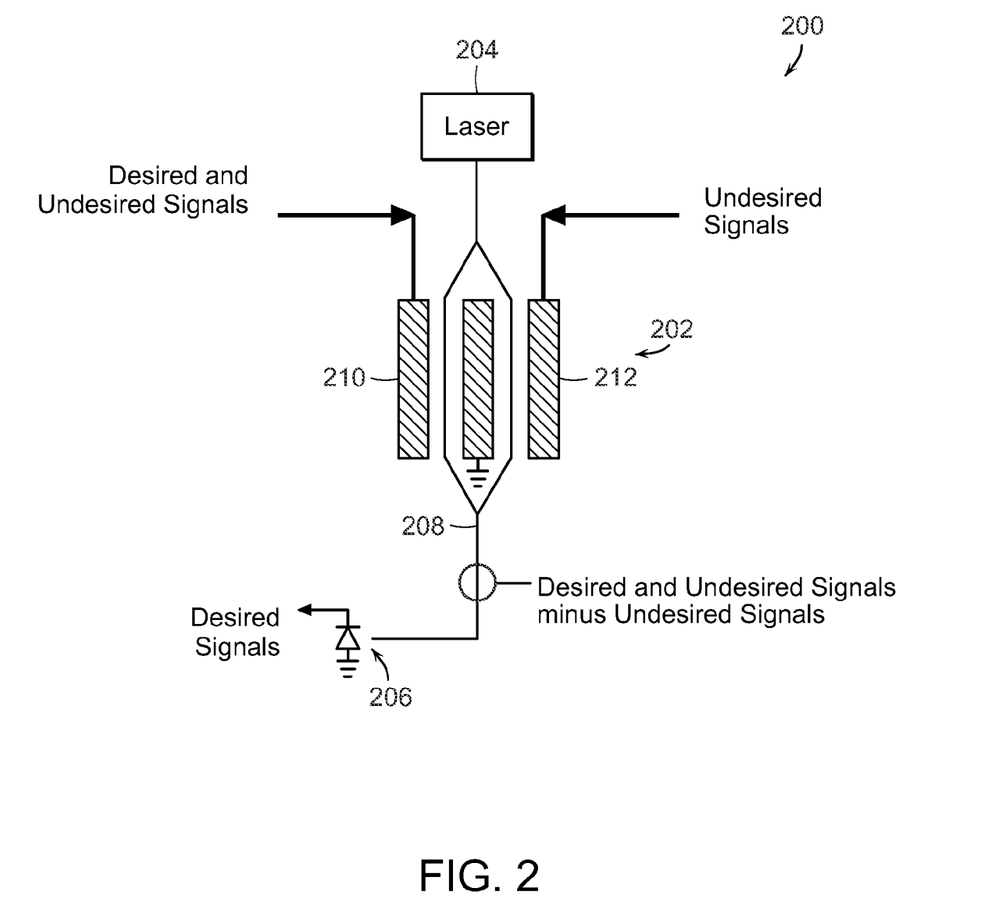
FIG. 2 is a block diagram of a photonic subtractor according to the present teaching.

FIG. 2 is a block diagram of one embodiment of a photonic subtractor 200 according to the present teaching. In one embodiment, the photonic subtractor 200 includes a dual-drive electro-optic modulator 202. A laser 204 is optically coupled to an optical input of the dual-drive electro-optic modulator 202. In some embodiments, an optical detector 206 is optically coupled to the output coupler 208 of the dual-drive electro-optic modulator 202 to convert the modulated optical output signal to an electrical signal. The dual-drive electro-optic modulator 202 includes a first electrode 210 that is coupled to a signal comprising the combination of the desired and the undesired electrical signal. In addition, the dual-drive electro-optic modulator 202 includes a second electrode 212 that is coupled to only the undesired electrical signal.

Dual-drive electro-optic modulators are well known in the electro-optic art. Dual-drive electro-optic modulators are sometimes configured so that a single modulation signal is applied to both of the dual-drive electrodes. The conventional configuration of a dual-drive electro-optic modulator includes a 180 degree phase shifter coupled to one of the dual-drive electrodes so that the electrical modulation experienced by a modulation signal applied to one of the dual-drive electrodes is the negative of the electrical modulation experienced by a modulation signal applied to the other one of the dual-drive electrodes. The output coupler of the dual-drive electro-optic modulator takes the difference between the modulated light from the two branches of the modulator. The dual-drive electro-optic modulator can also be designed to impart differential modulation on the first electrode 210 relative to the second electrode 212. In such a design, the output coupler 208 takes the difference between the modulated light from the two branches of the modulator, which is effectively the sum of the modulated light from the two branches of the modulator. Thus, the output modulation signal is the sum of the modulation signals applied to the dual-drive electrodes.

The photonic subtractor 200 does not include the 180 degree phase shifter that is typically used in dual-drive electro-optic modulators. Thus, the desired signal together with the undesired signal is applied to one of the dual-drive modulator electrode, while the undesired signal alone is applied to the other dual-drive electrode. Therefore, the same phase of the undesired electrical signal is applied to both of the dual-drive electrodes. The output coupler 208 of the photonic subtractor 200 takes the difference between the modulation on the two branches of the optical modulator 202, thus cancelling out the undesired signal and leaving only the desired signal to propagate to the optical detector 206.

The present teachings are described in connection with cancelling a transmission signal that has leaked into the receive signal path. However, one skilled in the art will appreciate that the apparatus and methods of the present teaching can be used in any application where an undesirable signal is present in the receive signal path. For example, there are many transceiver systems where a portion of a transmission signal leaks into the receive signal path. The magnitude of the transmission leakage signal is typically much less than the full power transmit signal. However, the magnitude of the transmission leakage is often much larger than the desired receive signal.

A common platform where such transmit and receive signal levels are present is an aircraft or ship. On aircrafts and ships, there are often several transmitters and receivers located in close proximity to each other. Even though the transmit antenna of one system might have a directional radiation pattern that is aimed in a different direction from the receive antenna of another system, such a configuration typically would provide only about 30 to 40 dB of isolation between the transmitter and receiver systems. For example, if the transmitter is radiating 10 W, a transmit signal with a power of 1 mW (or 0 dBm) is leaking into the receive path. For a receiver with a minimum sensitivity on order of −170 dBm, the undesired transmit leakage signal is very much larger than the desired receive signal.

Figure 3:
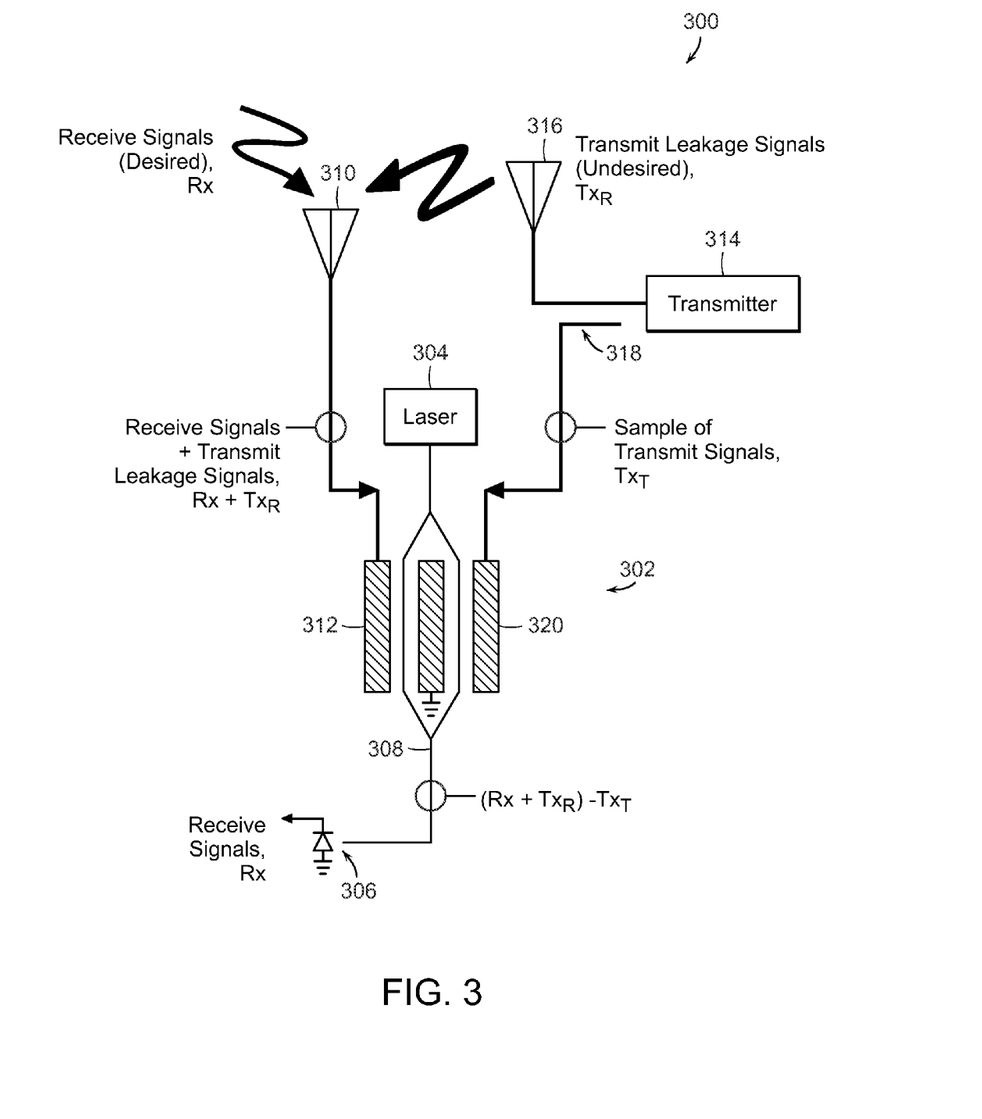
FIG. 3 is a block diagram of a co-site canceller including a photonic subtractor according to the present teaching that is configured to cancel transmitter signal leakage in the receive signal path.

FIG. 3 is a block diagram of a co-site canceller 300 including a photonic subtractor according to the present teaching that is configured to cancel transmitter signal leakage in the receive signal path. The co-site canceller 300 includes a dual-drive electro-optic modulator 302. A laser 304 is optically coupled to an optical input of the dual-drive electro-optic modulator 302. The laser 304 generates an optical carrier signal. An optical detector 306 is optically coupled to the output coupler 308 of the dual-drive electro-optic modulator 302. The optical detector 306 generates an electrical signal related to the output of the dual-drive electro-optic modulator 302.

A receive antenna 310 is coupled to an electrode 312 of the dual-drive electro-optic modulator 302. A transmitter 314 having an output coupled to a transmission antenna 316 is positioned proximate to the receive antenna 310. A coupler 318 is positioned proximate to the output of the transmitter 314 to couple a first portion of a first electrical signal, which in this example is a sample of the transmitter signal $Tx_T$. The output of the coupler 318 is electrically connected to an electrode 320 of the dual-drive electro-optic modulator 302. When the two modulated signals combine at the modulator output coupler 308, the receive signal Rx and the combination of the receive signal and the sample of the transmit signal $Tx_T$ are modulated onto the optical carrier. Total cancellation of the undesired signal will occur when both the magnitude and phase of $Tx_R$ equal the magnitude and phase of $Tx_T$.

The receive antenna 310 is intended to pick up the desired receive signal Rx, which in this example is a second electrical signal. However, in practice the receive antenna 310 also picks up some of the undesired transmit signal $Tx_R$ from the transmitter 314 located proximate to the receive antenna 310, which in this example is a second portion of the first electrical signal. In some systems, the undesired transmit signal $Tx_R$ (second portion of the first electrical signal) has the same or nearly the same frequency as the desired receive signal Rx (second electrical signal). The power of the desired receive signal Rx (second electrical signal) is often much less than the power of the undesired transmit signal $Tx_R$ (second portion of the first electrical signal). Therefore, there is a need to cancel the undesired transmit signal $Tx_R$ (second portion of the first electrical signal) received by the receive antenna 310. One skilled in the art will appreciate that although only one path between the transmission antenna 316 and receive antenna 310 is shown and described in connection with FIG. 3, in practical systems there can be numerous paths between the transmission antenna 316 and receive antenna 310.

A general method of cancelling a signal according to the present teaching includes coupling a first portion of a first electrical signal into a first electrical input of a dual-drive electro-optic modulator. A second portion of a first electrical signal and a second electrical signal is coupled into a second electrical input of the dual-drive electro-optic modulator. In the example described in connection with FIG. 3, the first portion of a first electrical signal is the sample of the transmit signal $Tx_T$, the second portion of a first electrical signal is the transmit leakage signal $Tx_R$, and the second electrical signal is the receive signal Rx.

An optical beam is generated that propagates from the optical input to an optical output of the electro-optic modulator. The optical beam is modulated with the first and second portions of the first signal and with the second signal. The modulation at least partially cancels the first and second portions of the first electrical signal, thereby generating a modulation signal with reduced first signal modulation.

One limitation of the co-site canceller 300 is that it requires applying the undesired signal alone without any of the desired signal to one of the dual-drive electrodes. Fortunately, in many practical applications of wide-bandwidth signal cancellers, such as transceivers and co-located transmitters and receivers, it is possible to isolate the undesired electrical signal from other signals.

Another limitation of the co-site canceller 300 is that it requires that the modulation of the optical signal by the combination of the desired electrical signal and the undesired electrical signal on one dual-drive electrode and the modulation of the optical signal by the undesired electrical signal alone on the other dual-drive electrode be equal to achieve compete or near complete signal cancelation. Thus, cancellation of the undesired signal at the optical output coupler 308 of the co-site canceller 300 requires that one of the electrodes of the optical modulator 302 receive an accurate copy of the undesired signal with the same temporal characteristics as the undesired signal applied to the receiving antenna 310. However, the exact amplitude, phase, and time delay of the undesired electrical signal $Tx_R$ at the receiving antenna 310 is not typically known.

Another limitation of the co-site canceller 300 is that there may be multiple paths of the undesired signal caused by reflections or caused by the distributed nature of the antennas themselves, which results in delays or echoes in the second portion of a first electrical signal which changes the second portion of a first electrical signal relative to the first portion of the electrical signal. For example, there are often multiple paths of reflections between the transmitter antenna 316 and the receiver antenna 310 that changes the transmit leakage signal $Tx_R$ relative to the sampled transmitter signal $Tx_T$. In addition, there are sometimes changes in the signal path length or propagation medium between the transmitter antenna 316 and the receiver antenna 310 that can result in amplitude and/or phase variations, which is sometimes referred to in the art as channel fading.

Another limitation of the co-site canceller 300 is that the degree of modulation that each of the dual-drive electrodes imparts on the optical signal is different for different electrodes. For example, the degree of modulation that each of the dual-drive electrodes imparts on the optical signal is a function of the overlap integral of the RF modulation and the optical mode. Each particular modulator has a unique overlap integral for each of the dual-drive electrode and these overlap integrals are not exactly the same. Furthermore, the overlap integrals are fixed when the modulator is fabricated and cannot be changed to balance the degree of modulation. In addition, the electrical loss in the cables connecting to the dual-drive electrodes is not exactly equal because of difference in length and/or manufacturing. Therefore, there are differences in the degree of modulation that each of the dual-drive electrodes imparts on the optical signal because of differences in the electrical characteristics of the cables connecting each of the dual-drive electrodes.

Consequently, there is a need to improve the co-site canceller 300 so that it cancels not just one undesired signal of fixed amplitude and phase but multiple undesired signals each with a different amplitude and phase that is not known and not necessarily fixed over time. In addition, there is a need to improve the co-site canceller 300 so that it compensates for different degrees of modulation that each of the dual-drive electrodes imparts on the optical signal.

One aspect of the present teaching is to use a signal processor, such as an adaptive signal processor, to adjust the signal parameters of the sample of the transmit signal $Tx_T$ to achieve more complete signal cancellation. For example, signal processing can be used to adjust the amplitude, phase and/or time delay of the undesired modulation signal to achieve more complete signal cancellation.

Figure 4:
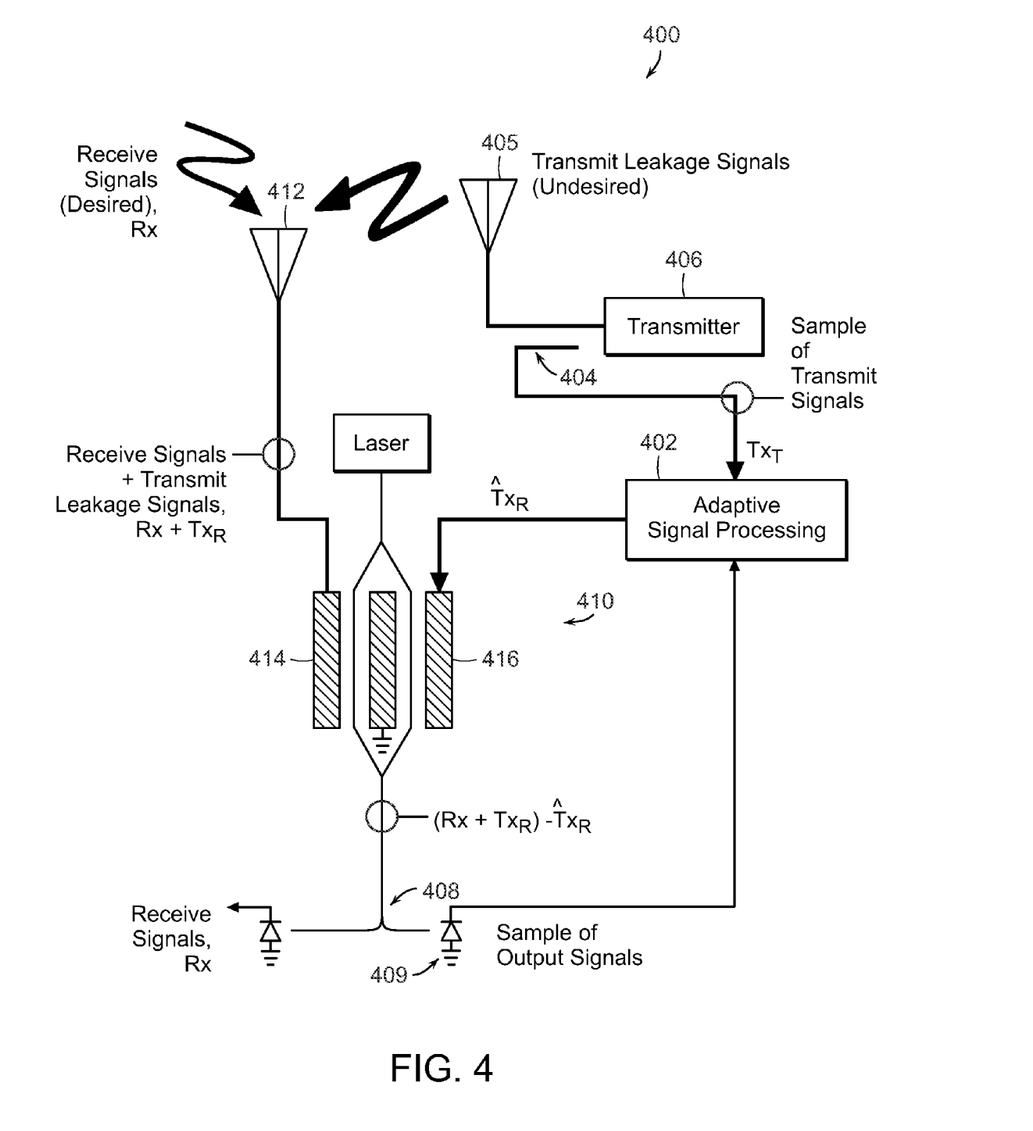
FIG. 4 is a block diagram of a photonic subtractor that includes a signal processor according to the present teaching to achieve more complete signal cancelation.

FIG. 4 is a block diagram of a co-site canceller 400 that includes a signal processor according to the present teaching that achieves more complete signal cancellation. The co-site canceller 400 is similar to the co-site canceller 300 that was described in connection with FIG. 3. However, the co-site canceller 400 includes a signal processor 402, such as an adaptive signal processor. A coupler 404 is positioned proximate to the output of the transmitter 406, which is coupled to a transmit antenna 405. The output of the coupler 404 is electrically connected to an input of the signal processor 402.

An optical coupler 408 is positioned proximate to the output of an optical modulator 410. The output of the optical coupler 408 is optically coupled to an optical detector, such as a photodiode 409. The electrical output of the photodiode 409 is electrically connected to a control input of the signal processor 402. A receiving antenna 412 is coupled to a first electrode 414 of a dual-drive electro-optic modulator 414. An output of the signal processor 402 is electrically connected to a second electrode 416 of the dual-drive electro-optic modulator 410.

In operation, the signal processor 402 samples the transmitter signal $Tx_T$ and the modulated optical signal and uses an algorithm to derive a compensation signal which improves or optimizes the cancellation performance of the co-site canceller 400. Enhanced signal cancellation is achieved because the adaptive signal processor produces an output signal which rapidly converges to a signal that is identical to or nearly identical to the transmit leakage signal $Tx_R$. In particular, the adaptive signal processor estimates and corrects for any unknown amplitude, phase, or delay variations between the undesired leakage signal at the receiver $Tx_R$ and the sample of the transmitter signal $Tx_T$ at the transmitter. Such discrepancies between the transmitter and receiver signals would almost always occur in practical systems and will result in less than perfect signal cancelation.

A method according to the present teaching that includes adaptive signal processing can include modifying the first portion of the first electrical signal, which is the sample of the transmit signal $Tx_T$ in the example described in connection with FIG. 3. The step of modify the first portion of the first electrical signal can include recursively estimating the first portion of the first electrical signal using the output of the optical modulator 410. In particular, the step of modify the first portion of the first electrical signal can include generating a first portion of the first electrical signal that has substantially the same amplitude and phase variation as the second portion of the first signal that is applied to the second electrical input. The step of modify the first portion of the first electrical signal can also include generating a first portion of the first electrical signal that has substantially the same time delay as the second portion of the first signal. The step of modify the first portion of the first electrical signal can also include compensating for a signal path delay in the first and second portions of the first signal. In addition, the step of modify the first portion of the first electrical signal can include modifying the first portion of the first electrical signal so that the first and second portions of the first electrical signal are substantially canceled in the optical subtractor.

In one embodiment of the present teaching, the signal processor 402 is implemented as an analog or a digital adaptive signal processor. In one particular embodiment, the adaptive signal processor is implemented as a digital filter as described herein. However, one skilled in the art will appreciate that the adaptive signal processor can be implemented with numerous types of devices.

In one method of implementing the adaptive signal processor 402 as a digital filter, the adaptive signal processor 402 computes a compensation signal $\hat{T}x_R[n]$ that is a linear combination of the input signal samples, $Tx_T[n]$ at each time sample n. Mathematically, $\hat{T}x_R[n]$ represents the output of a digital filter, which is described by $\hat{T}x_R[n]=w^H Tx_T[n]$, where w denotes a vector of unknown filter weights to be estimated and $$Tx_T[n]=[Tx_T[n]Tx_T[n-1]\ldots Tx_T[n-P+1]]^T$$

denotes a vector of input transmit signal samples where the variable P denotes the filter length. The operator "H" is the Hermition transpose. The adaptive signal processor 402 implements an algorithm that recursively estimates w in a way that minimizes the error signal $e[n]=Tx_R[n]-\hat{T}x_R[n]$ at each time step, n. Note that the expression for the error signal e[n] is a function of the unknown filter weights w since the output signal $\hat{T}x_R[n]$ is a function of the filter weight w.

One skilled in the art of adaptive signal processing will recognize that the recursive least-squares solution for the filter weight w that minimizes the error signal e[n] at each instant in time is given by $w[n]=w[n-1]+g[n]e^*[n-1]$, where the symbol "*" represents conjugation. The equation for the filter weight w recites that the correction applied to the filter weights at each instant in time is proportional to the measured error signal at the previous time step e[n−1] multiplied by a gain vector g[n]. The gain vector g[n] used here is similar to the "Kalman filter" gain that is used to solve many recursive estimation problems. This gain vector is computed recursively from the known transmit signal vector $Tx_T[n]$ as follows.

$$g[n]=P[n-1]Tx_T[n][\lambda+Tx_T^H[n]P[n-1]Tx_T[n]]^{-1}$$

$$P[n]=\lambda^{-1}P[n-1]-g[n]Tx_T^H[n]\lambda^{-1}P[n-1]$$

where P[n] is the covariance matrix associated with the current set of adaptive filter weights w[n] and λ is a tunable "forgetting factor" parameter that weights new data relative to old data and thus allows the filter to robustly adapt to changing input signal conditions.

Figure 5:
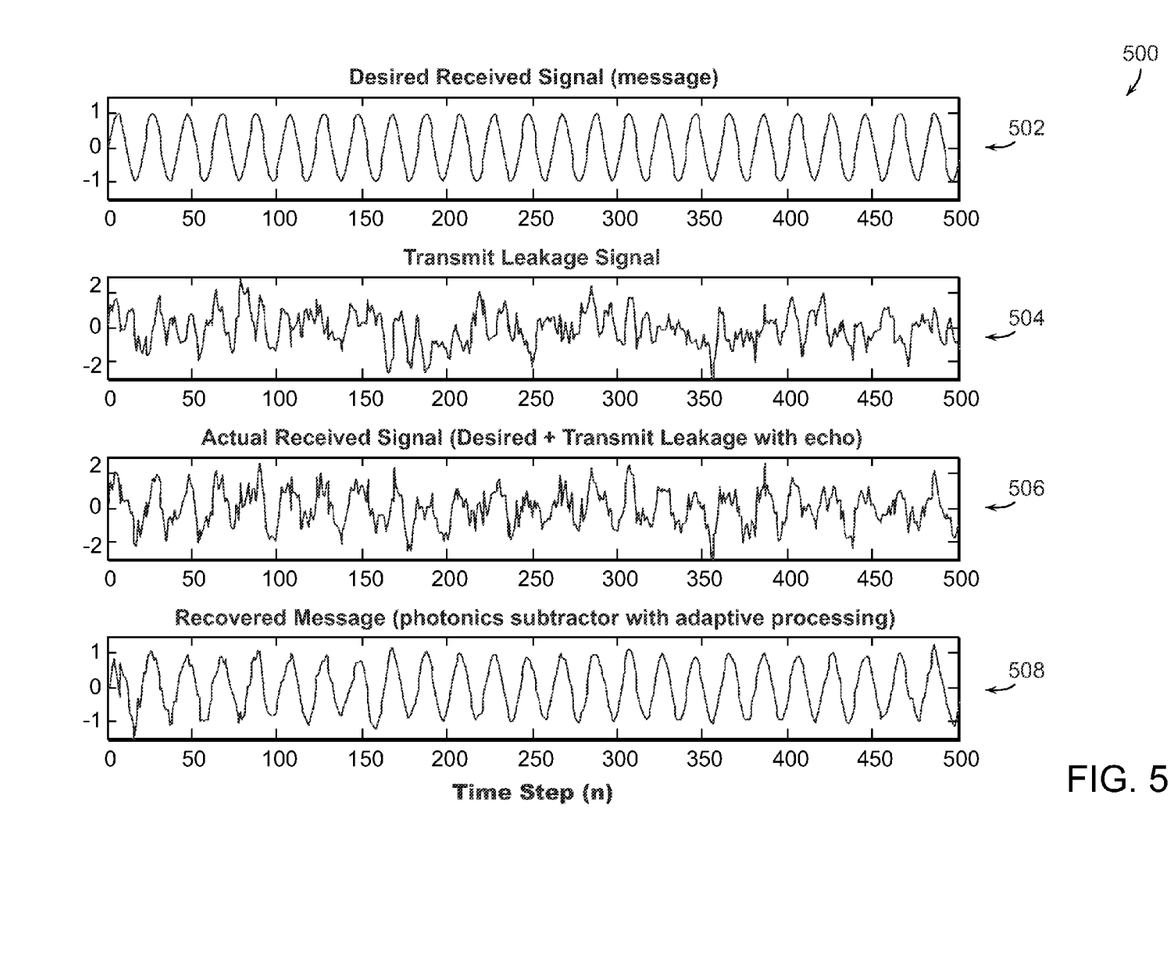
FIG. 5 illustrates results of a simulation that implements the photonic subtractor with an adaptive signal processor according to the present teaching.

FIG. 5 illustrates results of a simulation 500 that implements the co-site canceller 400 with an adaptive signal processor according to the present teaching. The first waveform in the simulation 500 is the desired received signal (or message) 502, which is a simple sine wave. The second waveform in the simulation 500 is the transmitter leakage signal 504, which in the simulation 500 is a broadband noise waveform. The third waveform in the simulation 500 is the actual received signal 506, which is a combination of the desired signal and the received transmit leakage and echo signals. The actual received signal 506 is assumed to contain an echo of unknown amplitude and time delay. In the simulation shown in FIG. 5, the actual received signal as a function of time can be represented by the following equation:

$$Rx\ \text{Signal}(t)=\text{Desired Signal}(t)+\text{Transmit Leakage}(t)-0.5*\text{Transmit Leakage}(t-\Delta t).$$

As described in connection with FIGS. 3 and 4, in order for the photonic canceller to recover the desired signal, a copy of the transmit leakage signal with the echo signals of unknown amplitude and time delay needs to be applied to the second electrode 412 of the dual-drive electro-optic modulator 410.

The adaptive signal processor 402 processes a sample of the transmit signal that is available at the transmitter site and accurately estimates the amplitude and time delay of the echo signal present at the receiver antenna. After a brief transient, the adaptive signal processor 402 generates a compensation signal that is approximately represented by:

$$\hat{T}x_R[n]=\text{Transmit Leakage}(t)-0.5*\text{Transmit Leakage}(t-\Delta t).$$

When the compensation signal is applied to the second electrode of the dual-drive electro-optic modulator, optical subtraction occurs and consequently the desired message is cleanly recovered. The fourth waveform 508 illustrates the recovered message.

Thus, the photonic canceller with the adaptive signal processor according to the present teaching can automatically compensate for any unknown delays, amplitude, or phase variations between the transmitter and receiver signals. One skilled in the art will appreciate that the adaptive signal processing described in connection with FIGS. 4 and 5 is not limited to photonic signal cancelling devices.

EQUIVALENTS

While the applicant's teaching are described in conjunction with various embodiments, it is not intended that the applicant's teaching be limited to such embodiments. On the contrary, the applicant's teaching encompass various alternatives, modifications, and equivalents, as will be appreciated by those of skill in the art, which may be made therein without departing from the spirit and scope of the teaching.

What is claimed is:

1. A signal canceller comprising:
   a. an optical subtractor having separate first and second electrical inputs, the first electrical input being coupled to a first portion of a first signal and the second electrical input being coupled to a second signal and to a second portion of the first signal; and
   b. a laser that is coupled to an optical input of the optical subtractor, the laser generating an optical beam that propagates from the optical input to an optical output of the optical subtractor,
      the optical subtractor modulating the optical beam with the first and second portions of the first signal and with the second signal, thereby generating an intensity modulated optical beam with a reduced first signal modulation component.

2. The signal canceller of claim 1 wherein the first and second portions of the first signal have substantially the same temporal characteristics.

3. The signal canceller of claim 1 wherein the first and second portions of the first signal have substantially the same amplitude and phase characteristics.

4. The signal canceller of claim 1 wherein the first portion of the first signal includes the same signal path delay as the second portion of the first signal.

5. The signal canceller of claim 1 wherein an overlap integral of the modulation and an optical mode of the electro-optic modulator is selected so that the first and second portions of the first signal substantially cancel during modulation.

6. The signal canceller of claim 5 wherein the first and second portions of the first signal substantially cancel during modulation when the first and second portions of the first signal are substantially the same.

7. The signal canceller of claim 1 further comprising a coupler that couples the first portion of the first signal into the first input.

8. The signal canceller of claim 7 wherein the coupler couples a portion of a transmission signal.

9. The signal canceller of claim 1 wherein the second input is coupled to an antenna that receives the second signal.

10. A signal canceller comprising:
    a. a Mach-Zehnder interferometric modulator comprising a first electrode electromagnetically coupled to a first arm of the Mach-Zehnder interferometric modulator and having an input coupled to a first portion of a first signal and a second electrode electromagnetically coupled to a second arm of the Mach-Zehnder interferometric modulator and having an input coupled to a second signal and to a second portion of the first signal; and
    b. a laser that is coupled to an optical input of the Mach-Zehnder interferometric modulator, the laser generating an optical beam that propagates from the optical input to an optical output of the Mach-Zehnder interferometric modulator,
       the Mach-Zehnder interferometric modulator modulating the optical beam with the first and second portions of the first signal and with the second signal, the modulation cancelling at least some the first signal, thereby generating a modulation signal with reduced first signal modulation component.

11. The signal canceller of claim 10 wherein the Mach-Zehnder interferometric modulator comprises a velocity matched Mach-Zehnder interferometric modulator.

12. The signal canceller of claim 10 wherein the first and second portions of the first signal have substantially the same temporal characteristics.

13. The signal canceller of claim 10 wherein the first and second portions of the first signal have substantially the same amplitude and phase characteristics.

14. The signal canceller of claim 10 further comprising a coupler that couples the first portion of the first signal into the first input.

15. The signal canceller of claim 14 wherein the coupler couples a portion of a transmission signal.

16. The signal canceller of claim 10 wherein the second input is coupled to an antenna that receives the second signal.

17. A signal canceller comprising:
    a. a dual-drive electro-optic modulator having a first electrical input being coupled to a first portion of a first signal and a second electrical input being coupled to a second signal and to a second portion of the first signal;
    b. a laser that is coupled to an optical input of the dual-drive electro-optic modulator, the laser generating an optical beam that propagates from the optical input to an optical output of the electro-optic modulator; and
    c. a signal processor having a first input that is electromagnetically coupled to the optical output of the electro-optic modulator, a second input that receives a portion of the first signal, and an output that is coupled to the first electrical input, the signal processor generating the first portion of the first signal,
       the dual-drive electro-optic modulator modulating the optical beam with the first and second portions of the first signal and with the second signal, thereby generating an intensity modulated optical beam with a reduced first signal modulation component.

18. The signal canceller of claim 17 wherein the signal processor comprises an adaptive signal processor.

19. The signal canceller of claim 17 wherein the signal processor performs a recursive estimation to generate the first portion of the first signal.

20. A method of cancelling a signal, the method comprising:
    a. coupling a first portion of a first electrical signal into a first electrical input of a dual-drive electro-optic modulator;
    b. coupling a second portion of a first electrical signal and a second electrical signal into a second electrical input of the dual-drive electro-optic modulator;
    c. generating an optical beam that propagates from the optical input to an optical output of the electro-optic modulator; and
    d. modulating the optical beam with the first and second portions of the first signal and with the second signal, thereby generating an intensity modulated optical beam with a reduced first signal modulation component.

21. The method of claim 20 further comprising modifying the first portion of the first electrical signal so that the first and second portions of the first electrical signal more completely cancel during modulation.

22. The method of claim 21 wherein the modulation signal is used to modify the first portion of the first electrical signal.

23. The method of claim 21 wherein the modifying the first portion of the first electrical signal comprises recursively estimating the first portion of the first electrical signal using the modulation signal.

24. The method of claim 21 wherein the modifying the first portion of the first electrical signal comprises adaptive signal processing the first portion of the first electrical signal using the modulation signal.

25. The method of claim 24 wherein the adaptive signal processing the first portion of the first electrical signal using the modulation signal comprises generating a first portion of the first electrical signal that has substantially the same amplitude and phase variation as the second portion of the first signal applied to the second electrical input.

26. The method of claim 24 wherein the adaptive signal processing the first portion of the first electrical signal using the modulation signal comprises generating a first portion of the first electrical signal that has substantially the same time delay as the second portion of the first signal.

27. The method of claim 21 wherein the modifying the first portion of the first electrical signal comprises compensating for a signal path delay in the first and second portions of the first signal.

28. The method of claim 21 further comprising modifying the first portion of the first electrical signal so that the first and second portions of the first electrical signal substantially cancel during modulation.

* * * * *